Sept. 4, 1962 W. S. LEWIS ET AL 3,052,831
ALTITUDE AND DIRECTIONAL CONTROL SERVOSYSTEM
Filed Feb. 8, 1960 3 Sheets-Sheet 1

INVENTORS.
William S. Lewis
Donald H. Mitchell
BY Mueller & Aichele
Atty.

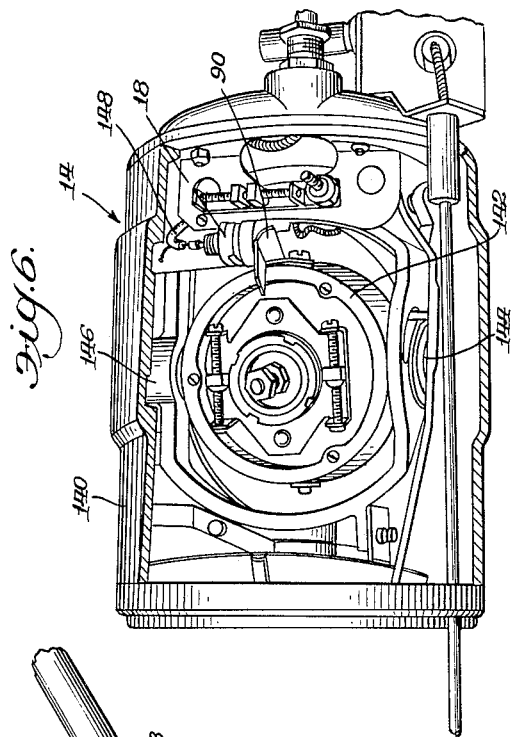
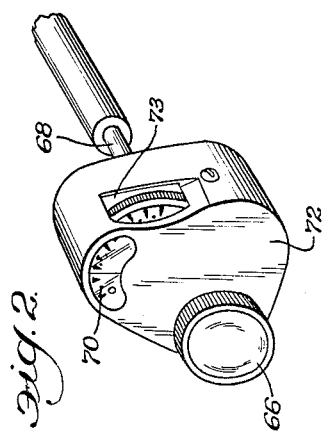
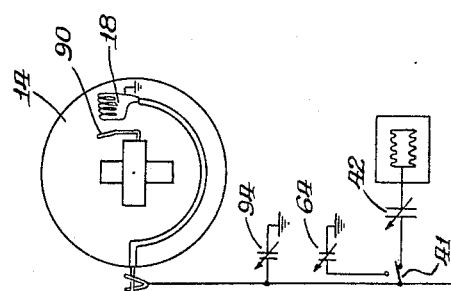
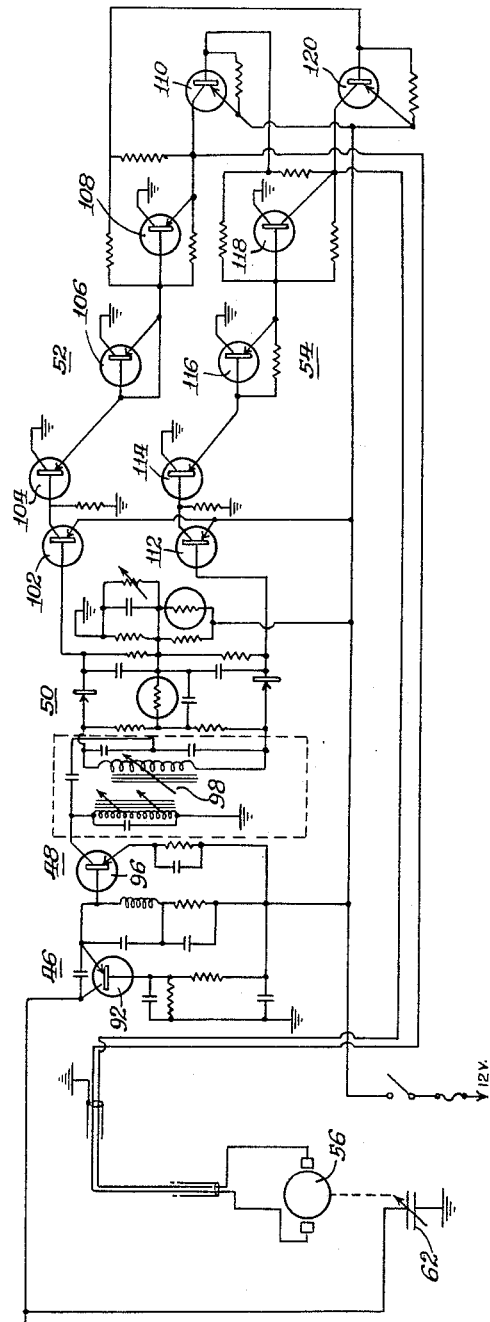

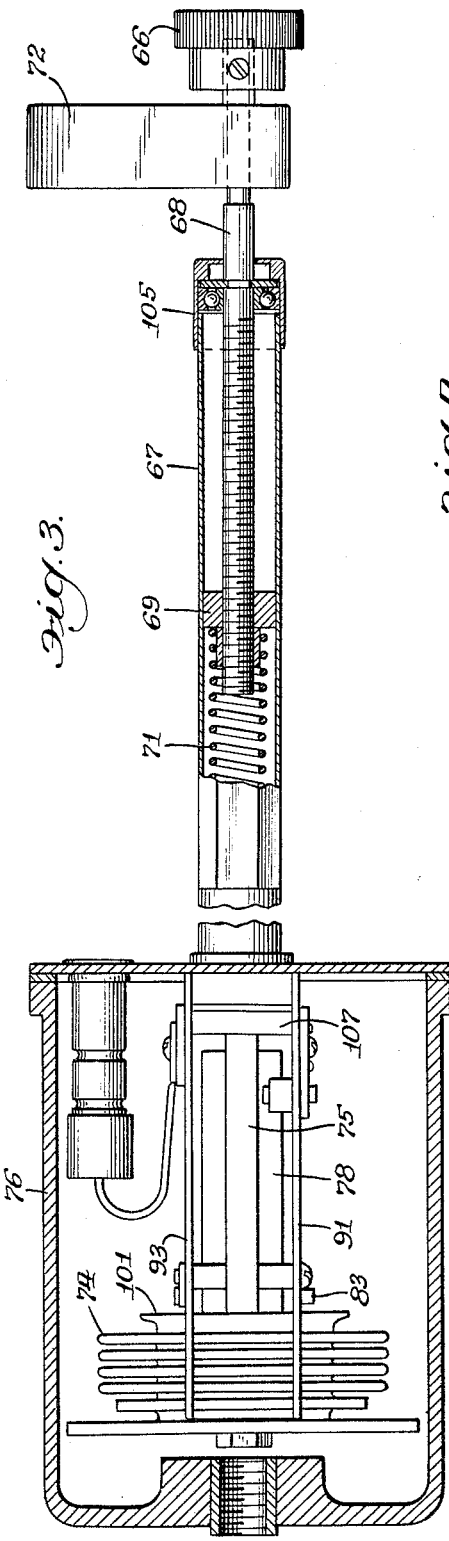
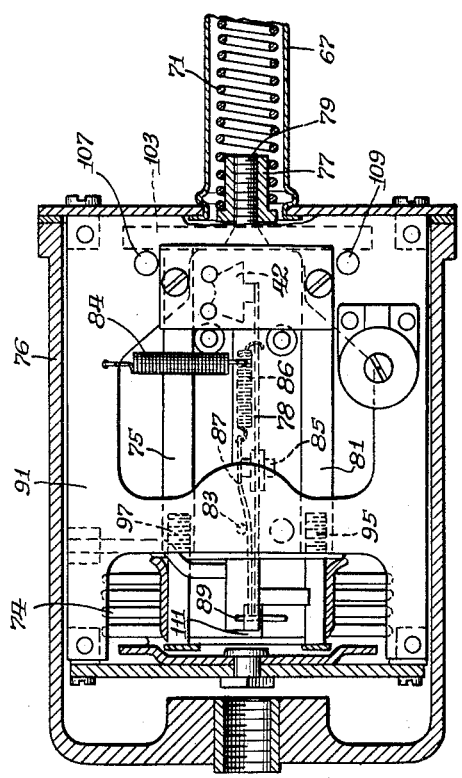
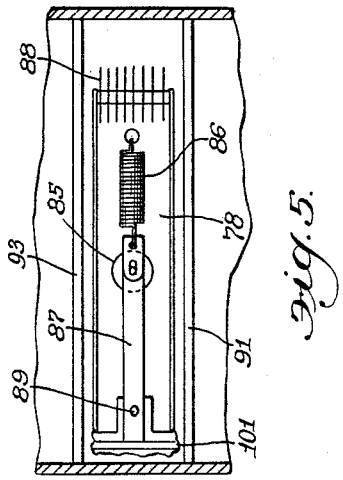

United States Patent Office 3,052,831
Patented Sept. 4, 1962

3,052,831
ALTITUDE AND DIRECTIONAL CONTROL SERVOSYSTEM
William S. Lewis, Dallas, and Donald H. Mitchell, Mineral Wells, Tex.; said Mitchell assignor to said Lewis
Filed Feb. 8, 1960, Ser. No. 7,265
11 Claims. (Cl. 318—481)

This invention relates to steering control apparatus and more particularly to apparatus for automatically attaining and maintaining a predetermined altitude for an aircraft during flight.

In the past, various devices for controlling the flight of aircraft have been provided. However, many of these devices are cumbersome especially from a weight standpoint and the devices are difficult and expensive to install. Present devices used to maintain an aircraft at a selected altitude during flight have been undersensitive, complicated, and/or inaccurate. Also, altitude selection before takeoff is not possible on some devices. In our Patent No. 2,853,671, issued September 23, 1958, automatic orientation equipment was disclosed which controlled the directional heading and the level or roll of the aircraft but this did not control the pitch or altitude of the craft.

Thus, it is an object of the invention to provide improved automatic flight control apparatus for aircraft which is of simple, inexpensive construction.

A further object is to provide an altitude selecting device for aircraft which is light in weight and requires a minimum amount of mechanical modification to the aircraft for installation.

Another object of the invention is to provide an altitude selector which can be adjusted for a desired altitude at any time, as before the aircraft leaves the ground.

Still another object of the invention is to provide an altitude controlling device for aircraft which responds to small altitude changes of the order of four feet or more.

A feature of the invention is the provision of aircraft altitude controlling apparatus which utilizes a bellows held in balanced suspension by force exerted on a spring.

Another feature of the invention is the provision of aircraft altitude controlling apparatus wherein capacitor plates are attached to a multiplying arm coupled to a pressure responsive bellows and stabilized by a spring impregnated with a damping substance.

Another feature of the invention is the provision of aircraft altitude controlling apparatus which utilizes an air dielectric variable capacitor for varying a reference control signal frequency. As the aircraft altitude changes, these variations in control signal frequency are amplified and actuate a reversible electric motor through transistor switch circuits to move the steering shaft of the aircraft.

A still further feature of the invention is the provision of aircraft altitude control apparatus utilizing a bellows coupled to a variable capacitance for changing the frequency of a control signal and having a high sensitivity to relatively small changes in altitude.

Another feature of the invention is the provision of an aircraft altitude control apparatus having an atmospheric pressure sensitive bellows coupled to a variable capacitance which may be set to a particular capacitance corresponding to a desired altitude before the aircraft is airborne wherein the frequency change of a control signal actuates steering mechanism of the aircraft causing it to climb to the desired altitude.

In the drawings:

FIG. 2 is a perspective view of the altitude selector dial assembly portion of the invention;

FIG. 3 is a cross-sectional side view of the altitude selector device;

FIG. 4 is a plan view of part of FIG. 3;

FIG. 5 is a fragmentary view of the central portion of FIG. 4;

FIG. 6 is a perspective cut-away view of the inside portion of an artificial horizon instrument showing the pitch coil assembly utilized in the invention; and FIG. 7 is a schematic diagram of the electronic circuit used in the invention.

Figure 1:
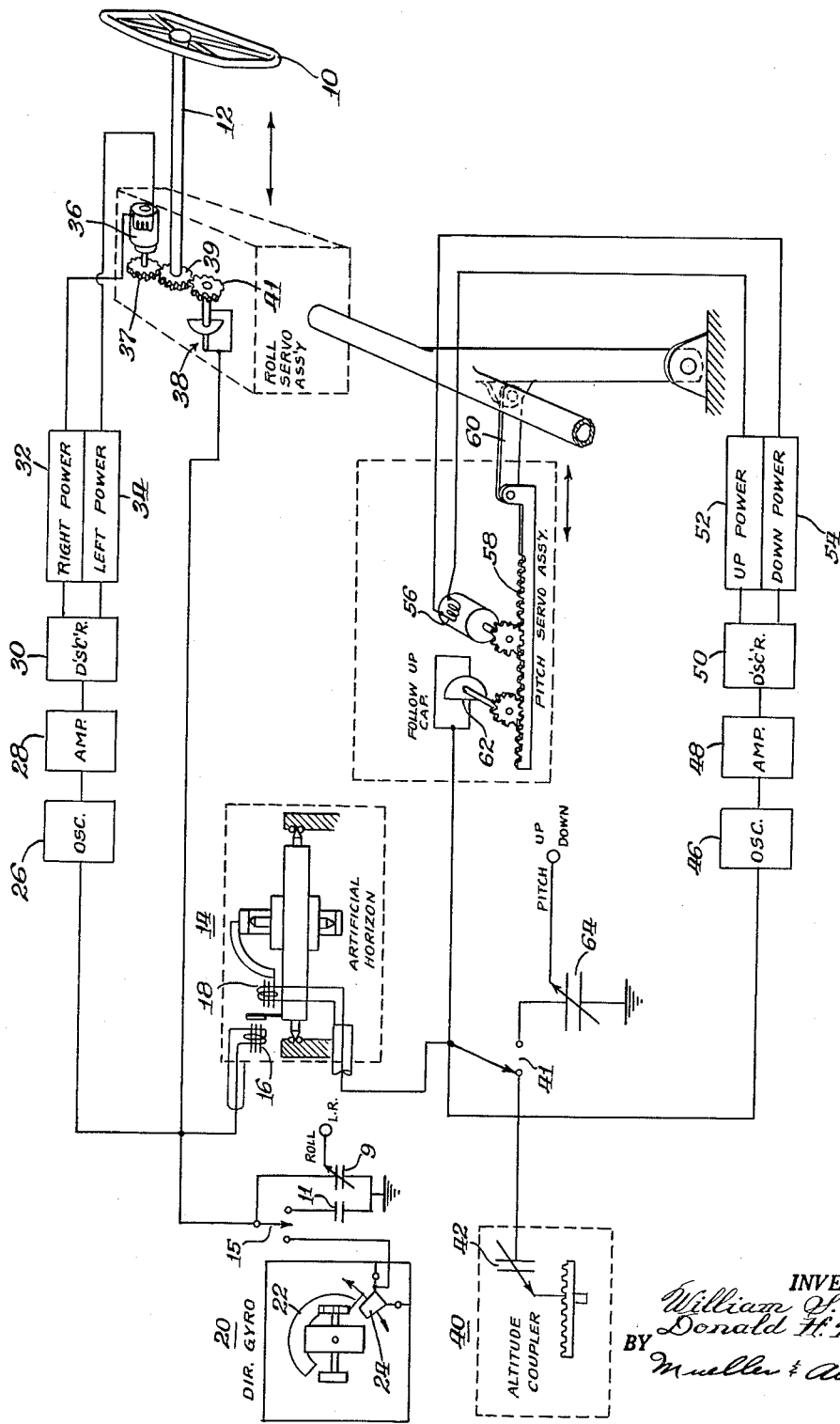
FIG. 1 is a functional block diagram of automatic steering control apparatus for aircraft incorporating the invention.

In practicing the invention, an altitude selector device is utilized as a component part of aircraft automatic control apparatus wherein the flight of an aircraft is controlled through variations in frequency of a reference signal. The reference signal is produced by an oscillator stage of an electronic circuit and the frequency is controlled by variable reactance elements. The electronic circuit amplifies the reference signal and converts it into voltages used for activating transistor switch circuits which drive a motor and in turn the motor moves the control shaft of the aircraft to attain and maintain a desired altitude. The altitude selector device includes a dial which may be set to automatically cause the aircraft to climb or descend to the desired altitude through control signal frequency deviation caused by a change in capacitance of a capacitor coupled to a bellows in the altitude selector device. The signal is also controlled through changes in inductance of a pitch coil coupled to the artificial horizon and by change in capacitance of a follow up capacitor. The control is applied through a frequency responsive circuit and a reversible motor coupled to the main steering control shaft of the aircraft. After the desired altitude is reached, the action of the atmospheric pressure, the artificial horizon, and the position of the steering shaft return the oscillator to its normal frequency. Thus, the aircraft is maintained at the desired altitude. The altitude selector device may be set before the aircraft leaves the ground, or after the aircraft is airborne.

FIG. 1 is a functional block diagram of a complete automatic steering system for aircraft of which the invention is a part. Basic control of modern aircraft is obtained through movement of wheel 10 coupled to main control shaft 12. Rotation of wheel 10 causes rotation of the aircraft about the roll and yaw axes thereby moving the aircraft to the left or the right during flight. When wheel 10 and shaft 12 are moved axially forward or backward, rotation of the aircraft about the pitch axis occurs thereby causing the aircraft to ascend or descend.

The control apparatus may be divided into two sections. The artificial horizon instrument 14 is common to both sections and contains variable inductance coils 16 and 18. Coil 16 is the roll coil mounted on an axis parallel to the roll axis of the aircraft and coil 18 is the pitch coil mounted on an axis parallel with the pitch axis of the aircraft. Coil 16 is used as part of the first section of the control apparatus.

Another instrument used in the first section to aid in orientation of the aircraft is directional gyro 20 which contains a variable capacitor having plates 22 and 24 which vary in capacitance with change in direction from a selected heading. Roll coil 16 in artificial horizon 14 and the capacitor composed of plates 22 and 24 in directional gyro 20 are connected to oscillator circuit 26 having variable reactance thereby producing a variable frequency control signal. The control signal frequency is varied by variations in the capacitance and inductance of capacitor plates 22 and 24 in the directional gyro 20 and roll coil 16 in artificial horizon 14. Switch 15 substitutes capacitor 11 for plates 22 and 24 when manipulating capacitor 9 to manually control heading of the aircraft. The oscillator control signal is amplified by amplifier 28 and fed to discriminator circuit 30. Discriminator circuit 30 energizes either right power circuit 32 or left power circuit 34. Either right power circuit 32 or left power circuit 34 may energize reversible electric motor 36 coupled through gears 37 and 39 to shaft 12. Direction of rotation of motor 36 is determined by actuation of one of power units 32 and 34 thereby correcting selected heading and roll of the aircraft during flight. Follow-up capacitor 38 is coupled to shaft 12 and re-establishes the control signal frequency at its normal frequency after shaft 12 has been rotated by motor 36. Thus, the first section of the automatic control system controls horizontal movement of the aircraft during flight.

The second section is used to control vertical movement of the aircraft during flight. In addition to pitch coil 18 mounted in artificial horizon 14, an altitude selector device 40 containing variable capacitor 42 is coupled to oscillator circuit 46. Switch 41 allows capacitor 64 to be substituted for capacitor 42 when manual pitch control is used. The pilot of the aircraft may disconnect automatic altitude control capacitor 42 and manually control pitch capacitor 64 to keep the aircraft at a particular attitude when flying through inclement weather conditions such as convection currents. Oscillator circuit 46, like oscillator circuit 26, produces a control signal of variable frequency. The signal is amplified by amplifier circuit 48 and fed to discriminator circuit 50 where voltage is developed to initiate either up power circuit 52 or down power circuit 54. Both up power and down power circuits actuate reversible electric motor 56 coupled to ratchet platform 58 which is coupled to shaft 12 through linkage 60. Motor 56 rotates in a clockwise or counter clockwise direction to cause movement of ratchet platform 58 and thereby move shaft 12 forward or backward. Follow-up capacitor 62 coupled to ratchet platform 58 and to oscillator circuit 46, re-establishes the control signal frequency at the standard frequency. Pitch capacitor 64 or altitude control capacitor 42 is connected to oscillator circuit 46 and through switch 41, selection of manual pitch control or automatic altitude control may be made.

Thus, two sections, the roll section and the pitch section control flight of the aircraft. The roll section servo assembly consists of motor 36, gears 37 and 39, and follow-up capacitor gear 41. The pitch section servo assembly consists of ratchet platform 58 and linkage 60 coupled to shaft 12 and follow-up capacitor 62 is coupled to ratchet platform 58.

FIG. 2 is a perspective view of the altitude selector dial assembly. Knob 66 rotates shaft 68 through suitable gear trains in housing 72 to set dial 70 to a particular altitude. Dial 70 is calibrated at an altitude of 19,000 feet but dial 70 may be operated uncalibrated to altitudes of 25,000 feet. Thumb opening 73 allows dial 70 to be set by hand to synchronize dial 70 with the altimeter reading of the aircraft.

FIG. 3 is a cross-sectional side view of the altitude selector device including the dial assembly shown in FIG. 2. Knob 66 is rotated to select a desired altitude on the dial in housing 72. Shaft 68 passes through sleeve cover 105 and inside shaft sleeve 67 to bushing 69. The threads on shaft 68 mesh with the inside threaded portion of bushing 69 to exert tension on spring 71 located inside shaft sleeve 67. As bushing 69 exerts tension on spring 71 edge 101 of evacuated bellows 74 in housing 76 is pulled into position by two rods of which 75 is one. Member 78 is pivoted by pin 83 connected between plates 91 and 93 separated by spacers of which 107 is one. Member 78 has capacitor plates mounted at the end opposite evacuated bellows 74 and these capacitor plates are positioned upon rotation of shaft 68.

FIG. 4 is a plan sectional view of the housing 76 portion shown in FIG. 3. Evacuated bellows 74 may be set mechanically or varied by atmospheric pressure from outside air. An explanation of mechanical setting follows. Spring 71 is attached to bushing 77 which is threaded to screw 79. Screw 79 passes through mounting bracket 103 attached to rods 75 and 81. Rods 75 and 81 are threaded to screws 95 and 97 which pass through edge 101 of bellows 74. As the force exerted by spring 71 is varied, edge 101 of bellows 74 is positioned. Extension 111 on bellows edge 101 is connected to flexible plate 87 through pin 89. Flexible plate 87 is pivoted between pin 83 mounted on plate 91 and mounting 85 on member 78. Spacers 107 and 109 act as stops between plates 91 and 93. Spring 86 exerts tension on flexible plate 87 and spring 84 holds member 78 in suspension thereby allowing atmospheric pressure change to vary the rotor plates and the capacitance of capacitor 42. The suspension of member 78 is very delicate and in order to stabilize it balance spring 84 is coated with a free flowing grease.

After the aircraft attains a selected altitude, any variation from this selected altitude will cause a variation in atmospheric pressure and bellows 74 will expand or contract slightly thus moving the rotor plates of capacitor 42 to change its capacitance which changes the frequency of the control signal produced by the oscillator circuit. Dialing a particular altitude causes bellows 74 and member 78 to be fixed in position. When the aircraft reaches the desired altitude, bellows 74 has either expanded or contracted according to the atmospheric pressure change and consequently member 78 and capacitor 42 are returned to normal position.

FIG. 5 is a fragmentary detail view of the central portion of FIG. 4. Spring 86 is attached to flexible member 87 and member 78. Rotor plates 88 are attached to member 78 and as explained previously this assembly causes variations in the control signal frequency in the pitch control section.

FIG. 6 is a perspective cut-away view of modified artificial horizon instrument 14 showing pitch coil 18 and pitch plate 90 in housing 140. Pitch coil 18 is fixed in position and pitch plate 90 is mounted on housing 142 which rotates about an axis passing through points 144 and 146 as the pitch of the aircraft changes. Movement of housing 142 and pitch plate 90 attached thereto causes a variation in inductance in coil 18 through lead 148 to the oscillator circuit in the pitch control section of the automatic steering apparatus.

FIG. 7 is a schematic diagram of the pitch control circuitry for actuating the pitch servo assembly shown in FIG. 1. Artificial horizon 14 contains variable inductance consisting of pitch control coil 18 and movable plate 90. Coil 18 is connected to the collector of transistor 92 in oscillator circuit 46. Transistor 92 is part of oscillator circuit 46 which produces a variable frequency control signal. Also connected to the collector of transistor 92 is either manual pitch control capacitor 64 or capacitor 42 in the altitude selector device; follow-up capacitor 62 is connected to the collector of transistor 92 also. Capacitor 94 is a trim capacitor mounted in the altitude selector device and also is coupled to the collector of transistor 92. The variable capacitance and variable inductance cause frequency deviations in the control signal output of oscillator circuit 46.

Transistor 96 is part of amplifier circuit 48 used to amplify the control signal. Transformer 98 is part of discriminator circuit 50 used to select signals which are above and below the standard control signal frequency to actuate either up power transistor switching circuit 52 or down power transistor switching circuit 54. Circuits 52 and 54 cause motor 56 to rotate in a clockwise or counter clockwise direction to maintain the aircraft at a selected altitude.

In order to explain the operation of the pitch control section assume, for example, that the aircraft is in flight and the nose is lowered momentarily. When the nose of the aircraft goes down the control signal frequency is raised through a decrease in the inductance of pitch coil 18 in artificial horizon 14. This frequency which is higher than the standard control signal frequency actuates up power transistor switch circuit 52. Transistors 102 and 104 are voltage amplifiers which amplify the voltage from discriminator circuit 50 before being fed to power amplifier transistors 106, 108 and 120. Transistor 120 energizes motor 56 through transistor 108 ground return. Transistor 120 is the switched transistor and transistor 108 is the grounding transistor. Thus, up power transistor switch circuit 52 actuates rotation of the servo motor in a clockwise direction thereby causing the aircraft nose to be raised and the control signal to be returned to normal frequency.

When down power is needed to correct pitch of the aircraft down power circuit 54 is energized. Transistors 112 and 114 are voltage amplifiers and transistors 116, 118 and 110 are power amplifiers. Transistor 110 is the switched transistor and transistor 118 is the grounding transistor providing a ground return from motor 56.

Thus, a frequency variation from the standard frequency actuates either up or down power transistor switch circuits 52 or 54 thereby energizing reversible motor 56 which in turn moves the steering column of the aircraft through suitable mechanism shown in FIG. 1.

Use of the altitude selector device now will be explained. Let us assume that the aircraft is flying at an altitude of 12,000 feet and an altitude of 15,000 feet is desired. Dial assembly knob 66 shown in FIG. 2 is rotated until dial 70 reads 15,000 feet. Knob 66 caused rotation of shaft 68 thereby setting capacitor 42 shown in FIG. 4 at higher than normal capacitance thereby lowering the control signal frequency and actuating up power transistor switch circuit 52. Motor 56 shown in FIG. 1 rotates in a clockwise direction thereby moving ratchet platform 58 and linkage 60 to cause steering shaft 12 to move toward the pilot. As the pitch of the aircraft changed because of a change in capacitance, the inductance of coil 18 in the pitch portion of artificial horizon 14 also increased to lower the control signal frequency to a value causing maximum rate of climb by moving shaft 12 to the fullest extent toward the pilot. Pitch follow-up capacitor 62 decreased in capacitance to return the control signal frequency to normal and de-energize servo motor 56 with control shaft 12 in a climb position. Thus, shaft 12 is fixed until the aircraft approaches 15,000 feet altitude and capacitor 42 begins to decrease in capacitance through decrease in atmospheric pressure. Pitch servo motor 56 is again actuated to cause counter clockwise rotation whereby control shaft 12 is moved forward and follow-up capacitor 62 increases in capacitance to compensate for the decreased capacitance of capacitor 42 in the altitude selector. Thus, when the aircraft reaches 15,000 feet, control shaft 12 is at a normal level flight position, pitch follow-up capacitor 62 is in its normal position, and capacitor 42 in the altitude selector also is in a normal position. The control signal frequency is at its standard frequency and transistor switch circuits 52 and 54 are at rest and continue to remain at rest until variations in altitude from 15,000 feet cause remedial action as explained previously.

Upon reaching the desired altitude dial 70 shown in FIG. 2 may be synchronized with the reading of the altimeter through setting of dial 70 at thumb opening 73 in housing 72. This synchronization will compensate for inherent differences of the altitude selector and altimeter when reacting to atmospheric pressure. Movement of dial 70 through opening 73 does not turn shaft 68.

Thus, the invention provides automatic altitude control for an aircraft by changing the reactance of an oscillator circuit which produces a variable frequency control signal. The altitude control system is added easily to a system for automatic directional control of an aircraft disclosed in our prior Patent 2,853,671. The altitude control system is compact, installation is simple, the initial cost is relatively low, and the system will respond to deviations in altitude of four feet or more.

We claim:

1. An altitude responsive device including a bellows assembly responsive to changes in atmospheric pressure, said bellows assembly including in combination a bellows, a variable capacitor having rotor and stator plates movable with respect to a normal position, dial means, spring means coupling said bellows assembly to said dial means, a movable member mechanically coupled to said capacitor rotor plates, said movable member being pivotally coupled to said bellows for varying the capacitance of said capacitor with movement of said bellows, a stationary member having said capacitor stator plates mounted thereon, and spring means coupled between said movable member and said stationary member, movement of said dial means to a position representing a particular altitude causing said spring means to position said movable member so that said bellows causes said capacitor to return to said normal position at a predetermined atmospheric pressure.

2. An altitude selection device for aircraft including in combination, a movable member responsive to changes in atmospheric pressure, dial assembly means having a calibrated altitude scale, spring means coupling said dial assembly means to said movable member, a variable capacitor having rotor and stator plates, a pivotally movable member coupled to said rotor plates, means coupling said pivotally movable member to said movable member, a fixed member supporting said stator plates, a spring coupled between said pivotally movable member and said fixed member, movement of said dial to a particular altitude position on the scale of said dial assembly means causing said spring means to position said movable member and said rotor plates on said pivotally movable member for fixed capacitance until atmospheric pressure at the selected altitude causes said movable member, said pivotally movable member, and said capacitor rotor plates to return to a position wherein said pivotally movable member is held in suspension by said spring.

3. An altitude selection device for aircraft including in combination, bellows means responsive to changes in atmospheric pressure, a movable member coupled to said bellows means, dial assembly means having a calibrated altitude scale, spring means coupling said dial assembly means to said movable member, a variable capacitor having rotor and stator plates, a pivotal member having said rotor plates mounted thereon, means coupling said pivotal member to said movable member, a fixed member having said stator plates mounted thereon, a spring impregnated with a damping compound coupled between said pivotally movable member and said fixed member, said movable member being positioned in response to dialing a particular altitude on the scale of said dial assembly means, said movable member and said bellows means positioning said pivotally movable member to thereby position said rotor plates for a given capacitance at the atmospheric pressure of a selected altitude.

4. Automatic control apparatus for an aircraft having a steering column adapted for rotation and pivotal movement to control the aircraft, a level indicator for the aircraft including a first movable portion indicating the roll of the aircraft and a second movable portion indicating the pitch of the aircraft, and a directional indicator for the aircraft, said apparatus including in combination first and second sections, said first section including reversible electric motor means, means coupling said motor means to the steering column for rotating the same, a wave signal oscillator including first, second and third variable frequency controlling portions for increasing and decreasing the frequency of a control signal normally of reference frequency produced by the oscillator, means connecting said first frequency controlling portion to the steering column for varying the same with rotation thereof, means connecting said second frequency controlling portion to said first movable portion of said level indicator for changing the frequency of said oscillator in response to roll of the aircraft, said third frequency controlling portion being a capacitor coupled to said directional indicator whereby capacitance of said capacitor is varied with variation from a particular heading selected on said directional indicator, discriminator and control means coupled to said oscillator and to said motor means for energizing the same to rotate the steering column in respective directions in response to increase and decrease in said control signal frequency, said second section including second reversible electric motor means, means coupling said second motor means to the steering column for pivotal movement thereof, a second wave signal oscillator including first, second, and third variable controlling portions for increasing and decreasing the frequency of a control signal normally of referenced frequency produced by the oscillator, means connecting said first frequency controlling portion to the steering column for varying the same with pivotal movement thereof, means connecting said second frequency controlling portion to said second movable portion of said level indicator for changing the frequency of said second oscillator in response to pitch variations of the aircraft, said third frequency controlling portion being an altitude responsive device having bellows means responsive to changes in atmospheric pressure resulting from changes in altitude, spring means mechanically connected to said bellows means, dial means adjustable to control the tension of said spring means and having a calibrated altitude scale, a variable capacitor having rotor and stator plates, and a movable member supporting said rotor plates and coupled to said bellows means, said rotor plates being positioned in accordance with the setting of said dial means and the position of said bellows means and cooperating with said stator plates to provide a capacity which varies with the altitude of the aircraft and the setting of said dial means, discriminator and control means coupled to said second oscillator and to said second motor means for energizing the same to pivotally move the steering column in response to increase and decrease in said control signal frequency, the changes in frequency of the control signals in said first and second sections with changes in roll, pitch, directional heading, and altitude of the aircraft being correlated to cause movement of the steering column by said first and second motor means to maintain selected roll, pitch, directional heading, and altitude of the aircraft.

5. Automatic control apparatus for an aircraft having a steering column adapted to control the aircraft, a level indicator for the aircraft including a first movable portion for indicating roll and a second movable portion for indicating pitch, an altitude responsive device and a directional indicator for the aircraft, said apparatus including in combination first and second sections, said first section including reversible electric motor means, means coupling said motor means to the steering column for moving the same, a wave signal oscillator including first, second, and third variable frequency controlling portions for increasing and decreasing the frequency of a control signal normally of reference frequency produced by the oscillator, means connecting said first frequency controlling portion to the steering column for varying the same with movement thereof, means connecting said second frequency controlling portion to said first movable portion of said level indicator for changing the frequency of said oscillator in response to roll of the aircraft, said third frequency controlling portion being a capacitor coupled to said directional indicator whereby capacitance of said capacitor is varied with variation from a particular heading selected on said directional indicator, discriminator and control means coupled to said oscillator and to said motor means for energizing the same to move the steering column in respective directions determined by increase and decrease in said control signal frequency, said second section including reversible electric motor means, means coupling said motor means to the steering column for movement thereof, a wave signal oscillator including first, second, and third variable controlling portions for increasing and decreasing the frequency of a control signal normally of referenced frequency produced by the oscillator, means connecting said first frequency controlling portion to the steering column for varying the same with movement thereof, means connecting said second frequency controlling portion to said second movable portion of said level indicator for changing the frequency of said oscillator in response to pitch variations of the aircraft, said third frequency controlling portion being a capacitor coupled to said altitude responsive device, discriminator and control means coupled to said oscillator and to said motor means for energizing the same to move the steering column determined by increase and decrease in said control signal frequency, the changes in frequency of the control signal in said first and second sections with changes in roll, pitch, directional heading, and altitude of the aircraft being correlated to cause movement of the steering column by said first and second section motors to maintain selected roll, pitch, directional heading, and altitude of the aircraft.

6. Automatic control apparatus for an aircraft having a steering column adapted for pivotal movement to control the pitch and altitude of the aircraft, a level indicator for the aircraft including a movable portion for indicating pitch, and an altitude responsive device, said apparatus including in combination reversible electric motor means, means coupling said motor means to the steering column for axial movement thereof, a wave signal oscillator including first, second and third variable frequency controlling portions for increasing and decreasing the frequency of a control signal normally of reference frequency produced by the oscillator, means connecting said first frequency controlling portion to the steering column for varying the same with movement thereof, means connecting said second frequency controlling portion to said movable portion of said level indicator for changing the frequency of said oscillator in response to pitch of the aircraft, said third frequency controlling portion being a capacitor coupled to the altitude responsive device the capacitance of which is varied with variation from a particular altitude selected on said altitude responsive device, discriminator and control means coupled to said oscillator and to said motor means for energizing the same to axially move the steering column in response to increase and decrease of said control signal frequency, the changes in frequency of said control signal with changes in pitch and altitude of the aircraft being correlated to cause axial movement of the steering column by said reversible motor to hold the aircraft at a selected altitude.

7. Automatic control apparatus for an aircraft having a steering column adapted for movement to control the pitch and altitude of the aircraft and a level indicator for indicating the pitch of the aircraft, said apparatus including in combination reversible electric motor means, means coupling said motor means to the steering column for movement thereof, a wave signal oscillator including first, second and third variable frequency controlling portions for increasing and decreasing the frequency of a control signal normally of reference frequency produced by the oscillator, means connecting said first frequency controlling portion to the steering column for varying the same with movement thereof, means connecting said second frequency controlling portion to said movable portion of said level indicator for changing the frequency of said oscillator in response to pitch of the aircraft, said third frequency controlling portion being an altitude responsive device having bellows means responsive to changes in atmospheric pressure resulting from changes in altitude, spring means mechanically connected to said bellows means, dial means adjustable to control the tension of said spring means and having a calibrated altitude scale, a variable capacitor coupled to the oscillatory circuit and having rotor and stator plates, and a movable member supporting said rotor plates and coupled to said bellows means, said rotor plates being positioned in accordance with the altitude setting of said dial means and the position of said bellows means and cooperating with said stator plates to provide a capacity which varies with variation from a particular altitude selected on said altitude responsive device, discriminator and control means coupled to said oscillator and to said motor means for energizing the same to move the steering column in response to increase and decrease of said control signal frequency, the changes in frequency of said control signal with changes in pitch and in altitude of the aircraft being correlated to cause movement of the steering column by said reversible motor to maintain a selected altitude of the aircraft.

8. Automatic control apparatus for aircraft having steering means adapted to control the pitch and altitude of the aircraft, said control apparatus including in combination, control means, means coupling said control means to said steering means to move the same, oscillator means including variable reactance means for producing a control signal of standard frequency associated with a given pitch and a given altitude of the aircraft, level indicating means including inductance means coupled to said oscillator reactance means, said inductance means being variable with changes in pitch of the aircraft, altitude responsive means including an air dielectric capacitor variable with change in atmospheric pressure caused by changes in altitude and coupled to said oscillator reactance means, said reactance means effecting changes in said control signal frequency, frequency responsive control means coupled to said oscillator means and said electric control means for energizing said motor according to the frequency of the control signal as varied by said reactance means thereby controlling the steering means in accordance with the pitch and altitude of said aircraft, and follow-up capacitor means coupled to said oscillator means and to said steering means to vary said control signal frequency with movement of the steering means to return the frequency of the control signal to said standard frequency.

9. Automatic control apparatus for aircraft having a steering column adapted to control the pitch and altitude of the aircraft, said control apparatus including in combination, a reversible electric motor, means coupling said motor to said steering column to move the same, oscillator means including variable reactance means for producing a control signal of standard frequency associated with a given pitch and a given altitude of the aircraft, altitude responsive means including an air dielectric capacitor variable with change in atmospheric pressure and coupled to said oscillator reactance means, said capacitor effecting changes in said control signal frequency, frequency responsive control means coupled to said oscillator means and said electric motor for energizing said motor for rotation in a particular direction according to the frequency of the control signal thereby controlling the steering column, and follow-up capacitor means coupled to said oscillator means and to said steering column to vary said control signal frequency with movement of the steering column to return the frequency of the control signal to said standard frequency when the steering column is moved.

10. Automatic control apparatus for aircraft including in combination, an oscillatory circuit, means for controlling the altitude of the aircraft in accordance with the frequency of said oscillatory circuit, and an altitude responsive device including bellows means responsive to changes in atmospheric pressure resulting from changes in altitude, spring means mechanically connected to said bellows means, dial means adjustable to control the tension of said spring means and having a calibrated altitude scale, a variable capacitor coupled to said oscillatory circuit and having rotor and stator plates, and a movable member supporting said rotor plates and coupled to said bellows means, said rotor plates being positioned in accordance with the altitude setting of said dial means and the position of said bellows means and cooperating with said stator plates to provide a capacity which varies with the altitude of the aircraft and the setting of said dial means, to thereby control the frequency of said oscillatory circuit and to in turn control the altitude of the aircraft.

11. An altitude responsive device for aircraft including in combination, bellows means responsive to changes in atmospheric pressure resulting from changes in altitude, spring means mechanically connected to said bellows means, dial means adjustable to control the tension of said spring means and having a calibrated altitude scale, a variable capacitor having rotor and stator plates, and a movable member supporting said rotor plates and coupled to said bellows means, said rotor plates being positioned in accordance with the setting of said dial means and the position of said bellows means and cooperating with said stator plates to produce a predetermined capacity at different altitudes in accordance with the setting of said dial means.

References Cited in the file of this patent

UNITED STATES PATENTS

| | | |
|---|---|---|
| 2,126,910 | Moseley | Aug. 16, 1938 |
| 2,334,704 | Hilferty | Nov. 23, 1943 |
| 2,405,228 | Mayrath | Aug. 6, 1946 |
| 2,474,618 | Divoll | June 28, 1949 |
| 2,657,350 | Rossire | Oct. 27, 1953 |
| 2,808,545 | Hirtreiter et al. | Oct. 1, 1957 |
| 2,866,141 | Frank et al. | Dec. 23, 1958 |